United States Patent [19]

Lee

[11] Patent Number: 5,159,540

[45] Date of Patent: Oct. 27, 1992

[54] HIGH-EFFICIENCY SATURABLE CORE VOLTAGE CONVERTER

[75] Inventor: James Lee, Monterey Park, Calif.

[73] Assignee: Hughes Aircraft Company, Los Angeles, Calif.

[21] Appl. No.: 848,608

[22] Filed: Mar. 9, 1992

[51] Int. Cl.[5] .......................................... H02M 3/338
[52] U.S. Cl. ..................................... 363/22; 363/133; 331/112; 331/113 R
[58] Field of Search .................................... 363/22-26, 363/133; 331/112, 113 R

[56] References Cited

U.S. PATENT DOCUMENTS

| | | | |
|---|---|---|---|
| 3,551,845 | 12/1970 | Zelina | |
| 4,314,327 | 2/1982 | DePuy | 363/22 X |
| 4,519,023 | 5/1985 | Lester | 363/22 X |

Primary Examiner—Emanuel T. Voeltz

Attorney, Agent, or Firm—Gordon R. Lindeen, III; Steven M. Mitchell; Wanda K. Denson-Low

[57] ABSTRACT

A self-oscillating DC to DC voltage converter having improved efficiency. The high efficiency saturable core voltage converter 100 of the present invention provides an output voltage across an output load $R_L$ in response to the input voltage at a source node 106 of a voltage source 104. The present invention includes a transistor switching network 120, 122 coupled to the source node 106. The switching network 120, 122 generates an alternating voltage in response to oscillation of the flux within a magnetic core 116. A voltage transformer 110 then impresses an output voltage across an output load $R_L$, thus providing a load current $I_L$. The inventive converter 100 further includes a feedback winding 112 for providing a transistor drive current to the transistor switching network 120, 122. A portion of the transistor drive current is shunted to the source node 106 by a source feedback arrangement 126, 130.

12 Claims, 2 Drawing Sheets

HIGH-EFFICIENCY SATURABLE CORE VOLTAGE CONVERTER

BACKGROUND OF THE INVENTION

1. Field of the Invention

This invention relates to direct current (DC) to DC voltage converters. More specifically, this invention relates to saturable core DC to DC voltage converters.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Magnetic coupled multivibrators are circuit networks designed to convert a direct current (DC) voltage at one level to a DC voltage at another level. In these networks, an input DC voltage is typically transformed into a load current of alternating polarity. Rectification of the associated load waveform yields a DC voltage of generally larger magnitude than the input voltage.

The transistors in conventional multivibrators operate exclusively as switches. The energy required to operate the transistor switches is provided by a feedback winding operatively coupled to a magnetic transformer core. The flux within the transformer core is driven to positive and negative saturation on succeeding half cycles inducing an alternating square wave voltage in a voltage transformer. This square wave is either directly delivered to the load or is rectified to a DC voltage having a magnitude predicated on the turns ratio of the voltage transformer.

In applications where the power available to energize the switching transistors is limited, the efficiency of the converter becomes of particular importance. In general, to maximize the efficiency of a power converter under load, the transistors should switch the maximum voltage possible. As a consequence of junction heating within the transistors, there exists a maximum collector current which can be switched independent of supply voltage. It follows that for a given collector current, power output increases directly with supply voltage. Assuming other circuit losses remain constant, the efficiency under load thus increases with increased supply voltage.

Unfortunately, high-power transistors utilized at such elevated supply voltages generally exhibit low current gain. This induces large transistor base currents as a consequence of the substantial collector currents flowing during high-power operation. Such large base currents degrade efficiency by creating high ohmic losses in an input resonant network disposed to drive the transistor switches.

In addition, certain voltage converters rely on external circuitry to trigger initial oscillation within the resonant transistor driver network. This requirement for an ancillary network to induce initial oscillation is often disadvantageous to the extent that the cost and complexity of the voltage converter is increased.

Accordingly, a need in the art exists for a high efficiency DC to DC voltage converter disposed to initiate oscillation without the aid of external circuitry.

SUMMARY OF THE INVENTION

The aforementioned need in the art is addressed by the high efficiency saturable core voltage converter of the present invention. The inventive voltage converter provides an output voltage across an output load in response to the input voltage delivered to a source node by a voltage source. The present invention includes a transistor switching network coupled to the source node. The switching network generates an alternating voltage in response to oscillation of the flux within a magnetic core. A voltage transformer then impresses an output voltage across an output load in order to deliver a load current. The inventive converter further includes a feedback winding for providing a transistor drive current to the transistor switching network. A portion of the transistor drive current is shunted to the source node by a source feedback arrangement. Thus, the present invention provides a high efficiency DC to DC voltage converter

DETAILED DEsCRIPTION OF THE INVENTION

Figure 1:
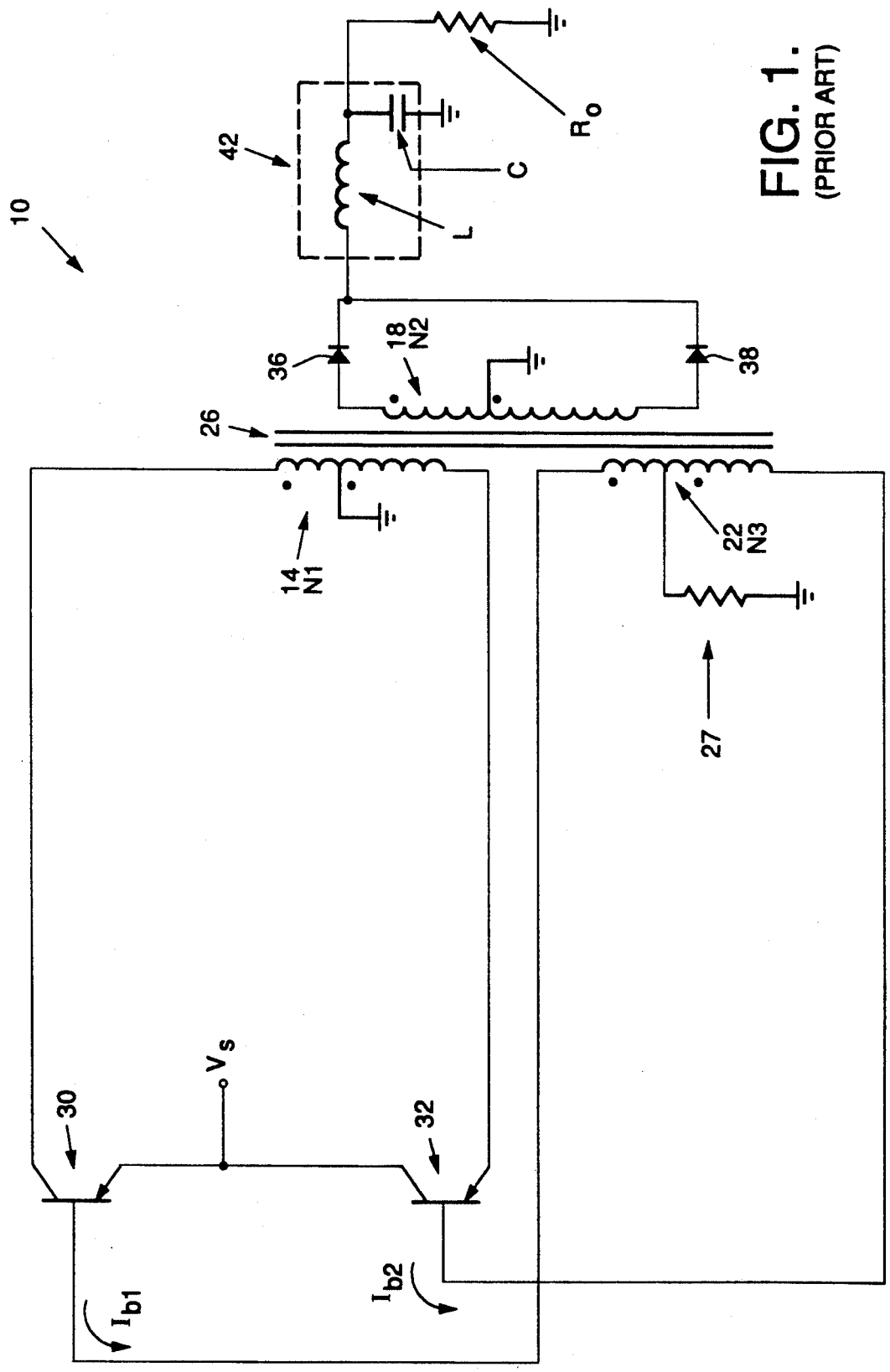
FIG. 1 shows a schematic representation of a conventional saturable core DC to DC voltage converter.

FIG. 1 shows a schematic representation of a conventional saturable core DC to DC voltage converter 10. An analysis of the operation of the voltage converter 10 is given initially herein in order that the advantages of the present invention may be more fully appreciated. The converter 10 is designed to impress a voltage across an output resistance $R_o$ in response to a first voltage provided by a first voltage source $V_S$. As shown in FIG. 1, the converter 10 includes first, second, and third transformer windings 14, 18 and 22. The windings 14, 18 and 22 are wound about a transformer core 26 in the usual manner, with the number of turns in each winding being denoted by N1, N2 and N3, respectively. As is indicated in FIG. 1, the first and second windings 14 and 18 are center-tapped to ground while the third winding 22 is center-tapped to a first resistor 27. The voltage converter 10 further includes first and second transistors 30 and 32 for delivering a first voltage $V_1$ to the first transformer winding 14. As is commonly known, the first voltage $V_1$ oscillates through the first winding 14 as the transistors 30 and 32 are alternately switched on and off. In this manner, the transformer core 26 is driven into positive and negative saturation during succeeding half-cycles of the current I1. (See, for example, Magnetics Corporation Application Note TWC-3OUT, page 19.) The transistors 30 and 32 are supplied with energy drawn from the feedback winding 22 in order to effectuate this switching function.

The periodically changing flux within the transformer core 26 induces an alternating voltage across the second winding 18. This alternating voltage is rectified by first and second diodes 36 and 38 and delivered to an output filter 42. The output filter 42 includes an inductor L operatively connected between the output resistance $R_o$ and the diodes 36 and 38, and further includes a capacitor C connected to ground in parallel with the output resistance $R_o$. In this manner DC current is supplied by the filter 42, which induces a DC output voltage to develop across the load $R_o$. The ratio of the magnitude of the output voltage to that of the voltage $V_S$ is equivalent to the winding ratio N2/N1.

As mentioned in the Background of the Invention, in certain applications involving large voltage swings (i.e., $V_S \geq 50$ volts) the high-power devices selected for the transistors 30 and 32 will generally exhibit poor base to collector current gain. This low current gain causes the first and second base currents $I_{b1}$ and $I_{b2}$ of the transistors 30 and 32 to become relatively large in response to elevated collector current levels. It follows that the large collector currents associated with high values of $V_S$ gives rise to an appreciable flow of base current through the first resistor 27. As a consequence, ohmic loss through the first resistor 27 due to the base currents $I_{b1}$ and $I_{b2}$ can be greater than desired. It is thus an object of the present invention to reduce the inefficiencies created by the substantial base currents arising during high-power voltage conversion.

Figure 2:
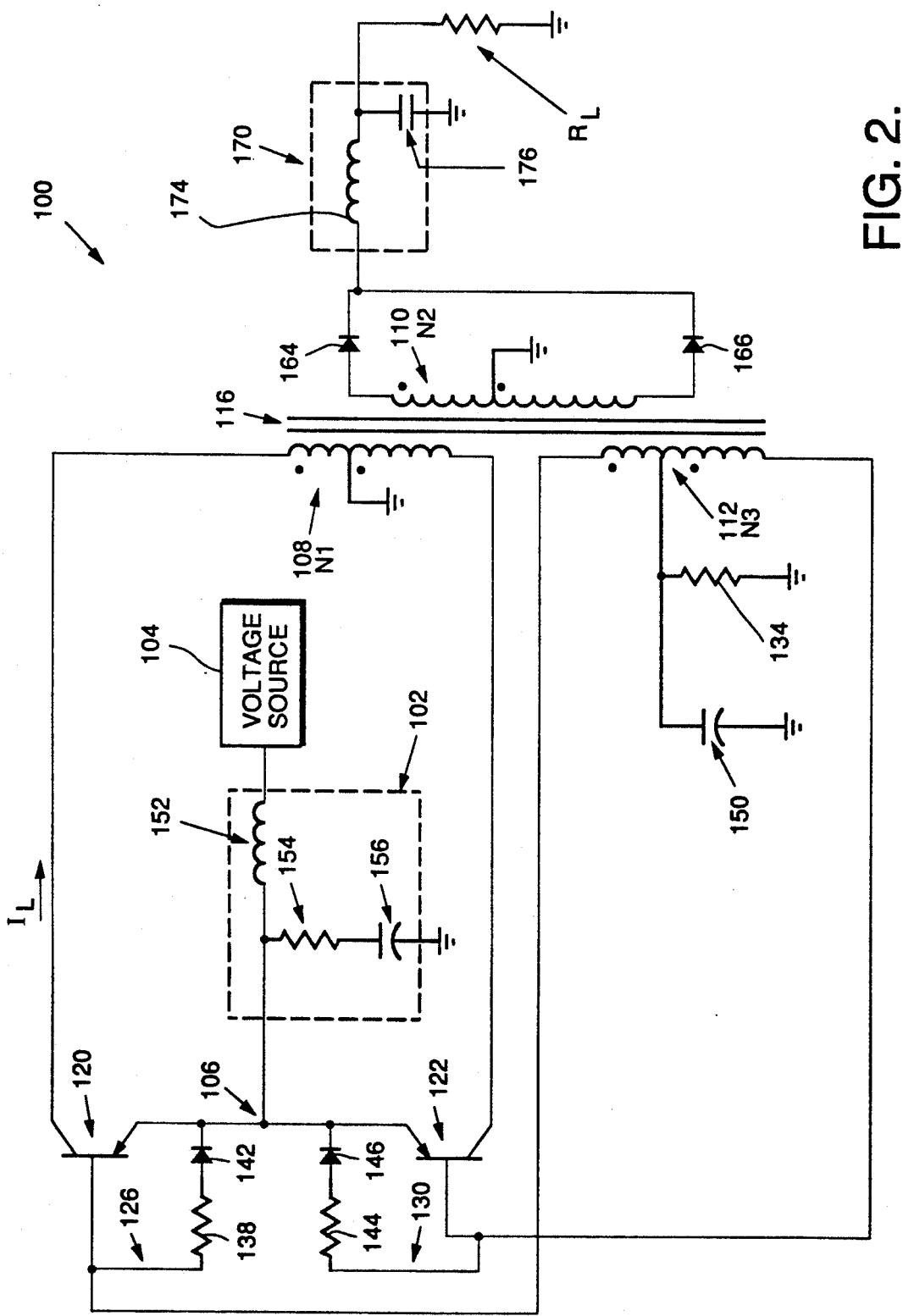
FIG. 2 shows a schematic representation of a preferred embodiment of the high-efficiency saturable core voltage converter of the present invention.

FIG. 2 shows a schematic representation of a preferred embodiment of the high-efficiency saturable core voltage converter 100 of the present invention. The inventive converter 100 includes a source coupling network 102 for placing a voltage source 104 in electrical communication with a source node 106. As is described hereinafter, the inventive converter 100 is disposed to convert the voltage $V_s$ impressed on the source node 106 to a load voltage $V_L$ across a load resistance $R_L$. The converter 100 of the present invention includes primary, secondary and feedback windings 108, 110 and 112 in communication with a magnetic core 116. The core 116 will preferably be fabricated from a low-loss, highly permeable material such as non-oriented NiFe (i.e. Permalloy 80). The primary, secondary and feedback windings 108, 110 and 112 are respectively wound with N1, N2 and N3 turns about the core 116. Accordingly, the desired voltage ratio $V_L/V_s$ is effectuated by adjusting the turns ratio N2/N1.

As shown in FIG. 2, a first end of the primary winding 108 is connected to the collector terminal of a first p-n-p bipolar switching transistor 120, and a second end to a second p-n-p bipolar switching transistor 122. Similarly, the base terminals of the first and second switching transistors 120 and 122 are coupled to first and second ends of the feedback winding 112. In addition, the emitters of each of the switching transistors 120 and 122 are in communication with the source node 106. In the preferred embodiment of FIG. 2 the transistors 120 and 122 are selected so as to be capable of high-power operation. The maximum voltage rating of the transistors 120 and 122 should be selected to be at least twice the largest voltage expected to be impressed on the source node 106. Again, high power transistors typically exhibit poor current gain and thus generate significant base currents when the collector currents thereof are raised in high voltage applications. As noted above, in conventional DC to DC voltage converters the ohmic losses engendered by these large base currents can degrade efficiency.

The present invention is designed to reduce the inefficiencies arising from large base currents by providing first and second feedback paths 126 and 130 between the sourc node 106 and the bases of the first and second transistors 120 and 122, respectively. In this manner ohmic losses are reduced by shunting the base currents of the transistors 120 and 122 away from a transistor driver resistor 134 and to the source node 106. As indicated in FIG. 2, the base currents from the transistors 120 and 122 flow to the driver resistor 134 through a center tap in the feedback winding 112. The driver resistor 134 forms a voltage divider with respect to the bases of transistors 120 and 122, and serves to initiate oscillation therein. Accordingly, the value of resistor 134 is selected such that the voltage divider provides the requisite oscillation voltage to transistors 120 and 122.

Referring to FIG. 2, the first feedback path 126 includes a first feedback resistor 138 connected between the base of the first transistor 120 and the input of a first diode rectifier 142. Similarly, the second feedback path 130 includes a second feedback resistor 144 coupled to the base of the second transistor 122 and to a second diode rectifier 146. During operation of the inventive converter 100 current will alternately flow through the first and second rectifiers 142 and 146 to the source node 106. The amount of base current shunted from the driver resistor 134 by the first and second feedback paths 126 and 130 depends primarily on the value of the feedback resistances 138 and 144 relative to that of the driver resistor 134. Specifically, the current magnitude through the feedback paths is designed to fully saturate transistors 120 and 122. In addition, the impedance selected for the feedback resistors 138 and 144 will generally vary inversely with the expected magnitude of the load impedance $R_L$.

The inventive converter 100 is designed to operate as a magnetically coupled circuit in which voltage switching is effectuated by saturation of the transformer core 116. More specifically, the alteration of the impedance of the core 116 during transitions in and out of saturation significantly increases the collector current through the transistors 120 and 122. Simultaneously, the voltage at the bases of the transistors 120 and 122 is reduced in order to facilitate rapid turn off thereof. The number of turns N1 within the primary winding 108 may be determined from the expression:

$$N1 = \frac{V_s \cdot 10^8}{4 \cdot B \cdot A_c \cdot f} \quad [1]$$

where B and $A_c$ denote the flux density and cross-sectional area of the core 116, respectively, and f represents the switching frequency. Again, once the number of primary turns has been selected the number of turns N2 included within the secondary winding 110 is given as:

$$N2 = N1(V_{load}/V_s) \quad [2]$$

where $V_{load}$ is the voltage across the load resistance $R_L$ and N1 is the number of turns in the primary winding 108. It follows that for a given magnetic core the parameters B and $A_c$ will be fixed. Thus, the primary turns ratio N1 is chosen such that the converter 100 functions at the desired operating frequency f. In addition, at least one volt will generally be required to drive the first and second transistors 120 and 122. This condition mandates that the number of turns N3 within the feedback winding 12 be at least that given by the following:

$$N3 = N1(V_{N3})/V_s \quad [3]$$

where $V_{N3}$ corresponds to the voltage across feedback winding 112. Given the voltage across winding 112, the value $R_f$ of the feedback resistors 138 and 144 is selected to be:

$$R_f = V_{N3} - V_{diode}/I_{base} \quad [4]$$

where $V_{diode}$ is typically on the order of 0.7 volts, and $I_{base}$ denotes the base current through transistors 120 and 122.

The inventive converter 100 further includes a base capacitor 150 for reducing power losses resulting from switching the first and second transistors 120 and 122. In particular, the base capacitor 150 is connected in parallel with the transistor driver resistor 134 via the center tap of the feedback winding 112. During operation of the converter 100 the voltage across the feedback winding 112 will periodically fall to zero as the transistors 120 and 122 are switched on and off. The capacitor 150 reduces switching losses by providing a low impedance drive to turn off either the first or second transistor 120 and 122 when the impedance (and voltage) across the feedback winding 112 falls to zero. Moreover, the low-impedance drive supplied by the base capacitor 150 allows current oscillation to be initiated within the converter 100 without the aid of external circuitry.

As is indicated in FIG. 2, the source coupling network 102 includes a noise attenuation inductor 152 connected between the voltage source 104 and the source node 106. The source coupling network 102 further includes a damping resistor 154 having a first end in communication with the source node 106. In addition, a grounded noise attenuation capacitor 156 is coupled to a second end of the resistor 154. The noise attenuation inductor and capacitor 152 and 156 combine to form an LC filter designed to prevent electrical noise present within the voltage source 104 from reaching the source node 106. In addition, the inductor and capacitor 152 and 156 attenuate switching noise generated by the transistors 120 and 122 that would otherwise propagate directly into the voltage source 104. The damping resistor 154 is disposed to preclude voltage spikes from developing across the first and second transistors 120 and 122 during the switching thereof.

Again, the periodically changing flux within the transformer core 116 associated with the switching of the transistors 120 and 122 causes an alternating voltage across the secondary winding 108. This alternating voltage is rectified by primary and secondary output diodes 164 and 166 and delivered to a load filter 170. The load filter 170 includes an impedance matching inductor 174 operatively connected between the load impedance $R_L$ and the output diodes 164 and 166. The load filter 170 further includes an impedance matching capacitor 176 connected to ground in parallel with the load resistance $R_L$. In this manner DC current is supplied by the filter 170, thus inducing a DC output voltage to develop across the load $R_L$.

While the present invention has been described herein with reference to a particular embodiment, it is understood that the invention is not limited thereto. The teachings of this invention may be utilized by one having ordinary skill in the art to make modifications within the scope thereof. For example, in alternative embodiments of the present invention a network including p-channel metal oxide semiconductor (MOS) transistors may be substituted for the arrangement of p-n-p switching transistors disclosed herein. Similarly, the inventive converter is not limited to a particular type of magnetic core material or transformer winding ratio. The selection of parameters such as these will be predicated on, for example, the desired operating frequency and the character of the load impedance.

It is therefore contemplated by the appended claims to cover any and all such modifications.

Accordingly,

What is claimed is:

1. A high efficiency voltage converter for providing an output voltage across an output load in response to an input voltage delivered by a voltage source, said converter comprising:
    a switching network for generating an alternating voltage, said switching network including a source node in electrical communication with said voltage source;
    a transformer for impressing an output voltage across said output load in response to said alternating voltage said transformer having a magnetic core;
    a feedback winding for providing a drive current to said switching network, said feedback winding being operatively coupled to said core; and
    a source feedback line for directing a portion of said drive current to said source node.

2. The voltage converter of claim 1 wherein said switching network includes first and second switching transistors having first and second control terminals, said first control terminal being connected to a first end of said feedback winding and said second control terminal being connected to a second end of said feedback winding.

3. The voltage converter of claim 2 wherein said source feedback line includes a first feedback path linking said first end of said feedback winding with said source node and a second feedback path linking said second end of said feedback winding with said source node.

4. The voltage converter of claim 3 wherein said first feedback path includes a first feedback resistance and wherein said second feedback path includes a second feedback resistance.

5. The voltage converter of claim 2 wherein said first switching transistor further includes first emitter and collector terminals and said second swi5ching transistor further includes second emitter and collector terminals, said first and second emitter terminals being connected to said source node.

6. The voltage converter of claim 5 wherein said transformer includes primary winding in magnetic communication with said magnetic core, said primary winding having a first end connected to said first collector terminal and a second end connected to said second collector terminal.

7. The voltage converter of claim 1 wherein said transformer includes:
    a secondary winding in magnetic communication with said amgnetic core, said secondary winding having first and second ends, and
    first and second load rectifiers respectively connected between said first and second ends of said secondary winding and said load.

8. The voltage converter of claim 1 further including a transistor driver network connected by a center-tap to said feedback winding.

9. The voltage converter of claim 1 further including a source filter network operatively coupled between said input voltage and said source node.

10. The voltage converter of claim 9 wherein said source filter network includes:
    a noise attenuation inductor linking said voltage source and said source node,
    a damping resistor having first and second ends, said first end being connected to said source node, and
    a noise attenuation capacitor coupled to said second end of said damping resistor.

11. A high efficiency voltage converter for providing an output voltage across an output load in response to an input voltage delivered by a voltage source operatively coupled to a source node, said converter comprising:
- a magnetic core;
- a feedback winding for providing a transistor drive current wherein said feedback winding includes first and second ends and is in magnetic communication with said core;
- first and second switching transistors having first and second control terminals, said first control terminal being connected to said first end of said feedback winding and said second control terminal being connected to said second end of said feedback winding;
- a primary transformer winding in magnetic communication with said core, said primary winding having a first end connected to said first transistor and a second end connected to said second transistor;
- a load winding for delivering an output current to said load, said load winding being in magnetic communication with said core; and
- a source feedback line for directing a portion of said transistor drive current to said source node.

12. The voltage converter of claim 11 wherein said source feedback line includes a first feedback path linking said first end of said feedback winding with said source node and a second feedback path linking said second end of said feedback winding with said source node.

* * * * *

UNITED STATES PATENT AND TRADEMARK OFFICE
CERTIFICATE OF CORRECTION

PATENT NO. : 5,159,540
DATED : October 27, 1992
INVENTOR(S) : James Lee

It is certified that error appears in the above-identified patent and that said Letters Patent is hereby corrected as shown below:

Col. 2, lines 25-26, please capitalize all letters in the title "DETAILED DESCRIPTION OF THE INVENTION".

Col. 3, line 60, please delete "sourc" and insert --source--.

Col. 6, line 37, please delete "swi5ching" and insert --switching--.

Col. 6, line 42, after the word "includes" please insert --a--.

Col. 6, line 50, please delete "amgnetic" and insert --magnetic--.

Signed and Sealed this

Twelfth Day of October, 1993

Attest:

BRUCE LEHMAN

Attesting Officer

Commissioner of Patents and Trademarks